United States Patent [19]

Maeda

[11] Patent Number: 5,020,388

[45] Date of Patent: Jun. 4, 1991

[54] WIRE GUIDE APPARATUS FOR WIRE-DRIVEN MECHANISM

[75] Inventor: Yuji Maeda, Kashiwa, Japan

[73] Assignees: Agency of Industrial Science and Technology; Ministry of International Trade & Industry, both of Tokyo, Japan

[21] Appl. No.: 582,104

[22] Filed: Sep. 14, 1990

[30] Foreign Application Priority Data

Sep. 21, 1989 [JP] Japan ................................ 1-246091

[51] Int. Cl.$^5$ ..................... G05G 11/00; A61F 2/58; B25J 11/00
[52] U.S. Cl. ....................................... 74/479; 623/63; 901/21; 74/501.5 R
[58] Field of Search ...................... 74/479; 623/59, 61, 623/63; 901/21

[56] References Cited

U.S. PATENT DOCUMENTS

| 3,261,223 | 7/1966 | Vertut | 901/21 X |
| 3,790,002 | 2/1974 | Germond et al. | 901/21 X |
| 4,921,293 | 5/1990 | Ruoff et al. | 74/479 X |

FOREIGN PATENT DOCUMENTS 3308474 9/1984 Fed. Rep. of Germany ........ 901/21

*Primary Examiner*—Allan D. Herrmann
*Assistant Examiner*—David W. Laub
*Attorney, Agent, or Firm*—Oblon, Spivak, McClelland, Maier & Neustadt

[57] ABSTRACT

A wire guide apparatus for a wire driven mechanism includes an arm stem member, an arm end member having a hand section, a joint section for rotatably coupling the arm end member to the arm stem member, a wire guide pulley, and a device for bending the arm end member relative to the arm stem member. The arm stem member is provided with a first drive source for driving the hand section via wires and a second drive source for driving the bending device. The wire guide pulley is rotatably supported at an eccentric position relative to an elbow position of the arm end member for guiding the wires to pass through the arm stem member and arm end member and is displaced toward the arm stem member by an amount corresponding to an extent of bending of the arm end member.

1 Claim, 3 Drawing Sheets

WIRE GUIDE APPARATUS FOR WIRE-DRIVEN MECHANISM

BACKGROUND OF THE INVENTION

1. Field of the Invention

This invention relates to a wire guide apparatus which can be effectively utilized for a wire driven mechanism such as a robot arm for performing various operations.

2. Description of Prior Art

The inventor previously pursued research for realizing a robot arm simulating a human arm in both function and appearance with a small-size, light-weight simple mechanism and proposed an anthropomorphic robot arm (U.S. patent application Ser. No. 440,113, now U.S. Pat. No. 4,986,723).

In the proposed robot arm, a drive source is provided on the stem side of the arm in order to make the movement of the arm as a whole smooth and is coupled via wires to a hand section for power transmission to and operation of hand section. However, for enabling operations of the hand section to be performed accurately it is necessary to hold the length of the wires passing through an elbow portion constant at all times irrespective of the extent of bending or streching of the arm. The length of wires passing through the elbow portion of the arm can be held constant if the wires are bent sharply at the elbow portion without use of any pulley or the like. Where a pulley or the like is used, however, the length of the wire is changed in accordance with the contact length of the pulley. Therefore, if the arm is bent greatly at the elbow portion, a large length of wire is required, while reduction of the degree of bending causes looseness of the wires. Therefore, it is difficult to transmit accurate motion to the hand section.

An object of the invention is to provide a wire guide apparatus which permits the length of wires passing through a joint section (an elbow portion) of a wire driven mechanism to be substantially constant irrespective of the extent of bending of the wire driven mechanism.

SUMMARY OF THE INVENTION

To attain the above object of the invention, there is provided a wire guide apparatus for a wire driven mechanism, comprising:

an arm stem member provided with first and second drive sources;

an arm end member provided at one end thereof with a hand section driven by the first drive source of the arm stem member via wires;

joint means rotatably coupling the other end of the arm end member and one end of the arm stem member;

a wire guide pulley rotatably supported at an eccentric position with respect to an elbow position of the arm end member for guiding the wires such that the wires pass through the centers of the arm stem member and the arm end member; and means for causing the arm end member to be bent at the joint means with respect to the arm stem member by the second drive source of the arm stem member.

With the wire guide apparatus having the above construction, by rotating the arm end member with the drive source the support shaft of the wire guide pulley is rotated and displaced to reduce by bypassing extent of the wires compared with the case where the support shaft of the pulley is fixed in position relative to the arm stem member. Thus, the length of the wire passing through the joint means can be held substantially constant irrespective of the extent of bending of the arm end member.

Thus, the wire driven mechanism including the hand section is less adversely affected by the movement the arm at the joint means.

The above and other objects and features of the invention will become apparent from the following detailed description with reference to the accompanying drawings.

DETAILED DESCRIPTON OF THE PREFERRED EMBODIMENT

The drawings illustrate an embodiment of the invention, i.e., an anthropomorphic robot arm provided with a wire guide apparatus according to the invention, particularly an arm mechanism with the wire guide apparatus disposed in an elbow joint section.

Figure 1:
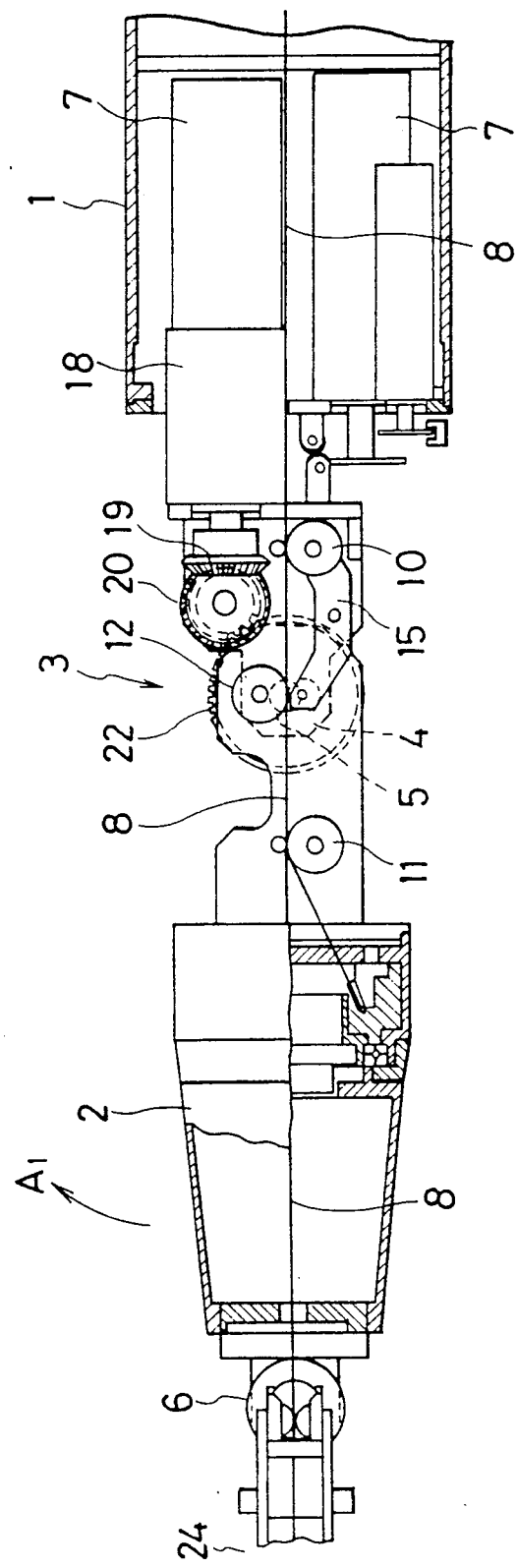
FIG. 1 is a side view, partly in section, showing an embodiment of the wire guide apparatus according to the invention.
Figure 2:
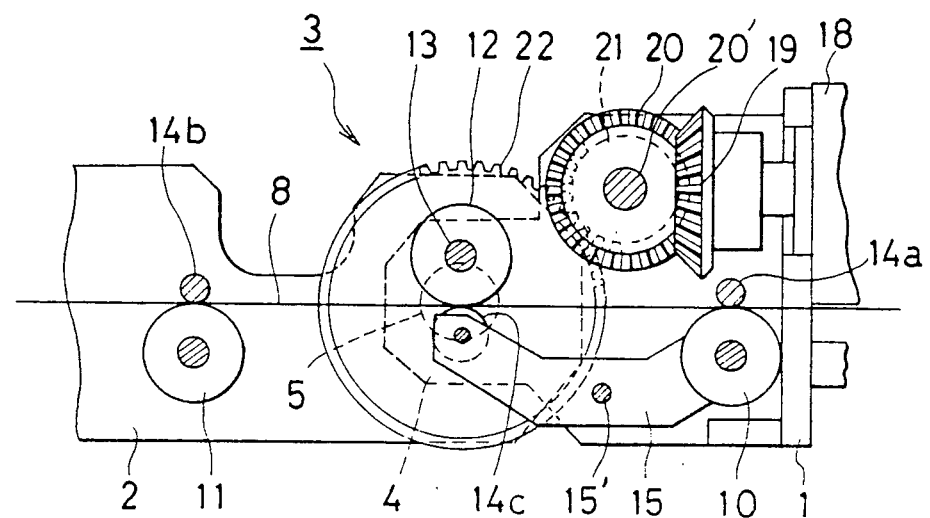
FIG. 2 is a fragmentary enlarged side view showing the wire guide apparatus shown in FIG. 1.
Figure 3:
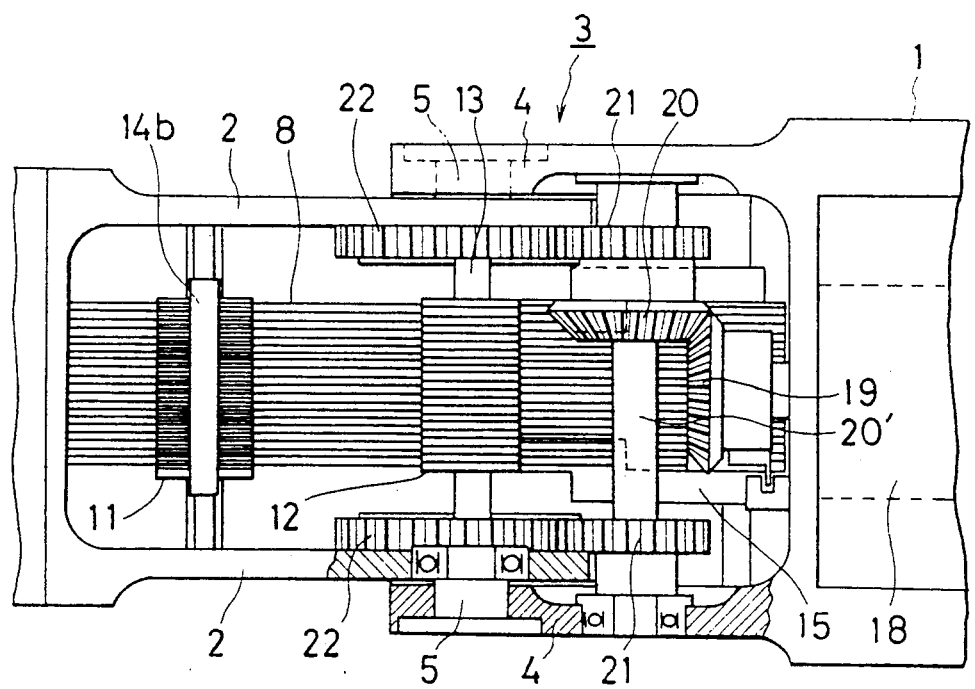
FIG. 3 is a fragmentary enlarged plan view showing the wire guide apparatus shown in FIG. 1.

The arm mechanism, as shown in FIG. 1, comprises an arm stem member 1 and an arm end member 2 having one end thereof provided with a hand section 24 which is rotatable via a joint 6. The arm stem member 1 and arm end member 2 are rotatably coupled to each other by a joint section which corresponds to an elbow. FIGS. 2 and 3 show the details of coupling in the joint section 3. As is shown, the rear ends of the arm end member 2 are rotatably coupled by a shaft 5 to a pair of support portions 4 projecting from the end of the arm stem member 1. The hand section 24 is rotatably coupled by the joint 6 to the end of the arm end member 2 as noted above. (The structural details of the hand section 24 are not shown).

The hand section 24 is driven via wires 8 by a drive source 7 consisting of a motor provided in the arm stem member 1. In an arm mechanism simulating a human arm, the hand section including a wrist part, a palm part and finger part has to have not less than 20 degrees of freedom and to be capable of complicated and skillful operations. Therefore, if the arm mechanism is to be driven by the drive source 7 provided on the arm stem side, a large number of wires 8 have to pass through the joint section 3. In order for the hand section to operate accurately it is necessary to make the wire length constant irrespective of the degree of bending of the arm end member at the joint section 3 when the wires 8 pass through the joint section 3.

For guiding the large number of wires 8 independently of one another, the arm stem member 1 is provided with a wire guide pulley 10, while the arm end member 2 is provided with another wire guide pulley 11.

The arm stem member 1 is provided with a second drive source (i.e., motor) 18 for rotating the arm end member 2 about the joint section 3. The output shaft of the drive source 18 is provided with a bevel gear 19, and another bevel gear 20 meshing with the bevel gear 19 is rotatably supported on a shaft 20' provided in the support portions 4 of the arm stem member 1. A pair of spur gears 21 are secured to the opposite ends of the shaft 20' of the bevel gear 20. The inner surfaces of the arm end members 2 are provided with spur gears 22 secured thereto coaxially with the shaft 5 of the joint section 3. The spur gears 22 are meshed with the spur gears 21. Thus, when the bevel gear 19 is rotated by the second drive source 18, the arm end member 2 is rotated about the shaft 5 as shown in FIGS. 4(a) and 4(b) via the bevel gear 20 and spur gears 21 and 22.

A guide pulley 12 is provided between the pair of spur gears 22. The ends of a support shaft 13 which rotatably supports the guide pulley 12 are supported by the pair of spur gears 22 such that the lower end of the guide pulley 12 is found at the center of the shaft 5. In this way, the guide pulley 12 guides the wires 8 such that the wires 8 substantially pass through the centers of the arm stem and arm end members 1 and 2. Small rollers 14a, 14b and 14c provided such that they face the guide pulleys 10, 11 and 12 such that the wires 8 do not separate from the pulleys resptectively.

In FIGS. 2 to 4, designated at 15 is a pair of support arms rotatably supporting at one end the small rollers 14 facing the guide pulley 12 and also rotatably supporting at the other end the guide pulley 10. The support arms 15 is pivotally coupled by pins 15' to the support portions 4. The small roller 14c is in contact with the guide pulley 12, while the guide pulley 10 is in contact with the small roller 14a.

Figure 4A:
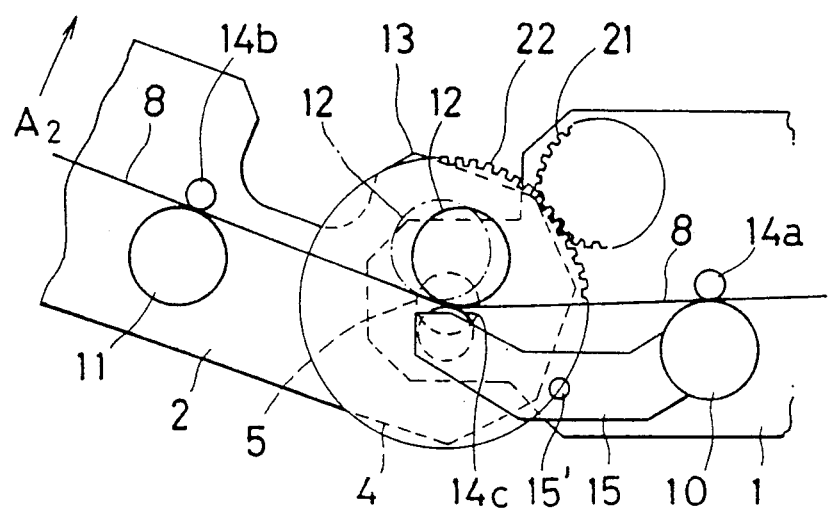
FIG. 4(a) is an explanatory view illustrating a state of the wire guide apparatus of FIG. 1 wherein an arm end member is bent slightly relative to an arm stem member.
Figure 4B:
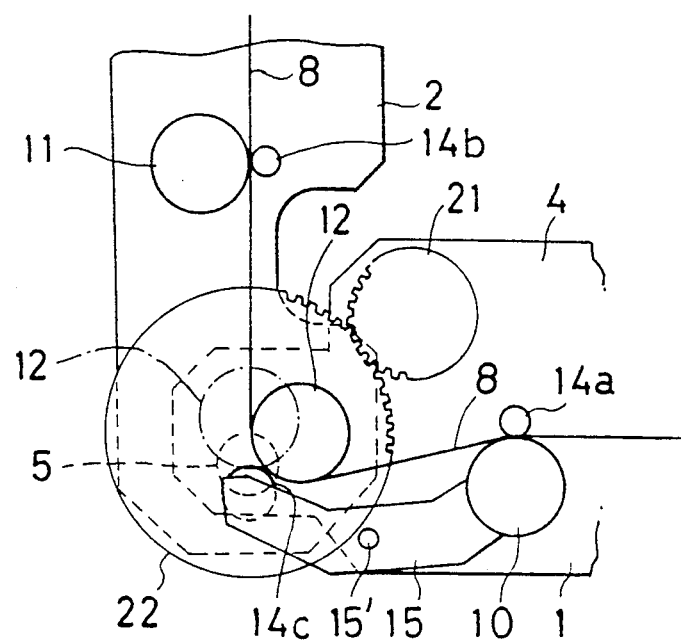
FIG. 4(b) is an explanatory view illustrating a state of the wire guide apparatus wherein the arm end member is bent greatly.

In the wire drive mechamism having the above construction, when the arm end member 2 is rotated in the direction of arrow $A_1$ in FIG. 1 about the shaft 5 by the drive source 8, the rotation of the gears 22 secured to the shaft 5 causes displacement of the support shaft 13 of the guide pulley 12 in the direction of arrow $A_2$ in FIG. 4(a). Thus, where the support shaft 13 of the pulley 12 is fixed in position with respect to the arm stem member 1, the wires 8 are pulled to an extent necessary for bypassing the guide pulley 12. However, since the support shaft 13 of the guide pulley 12 is displaced to an extent corresponding to the amount of bending toward the arm stem member 1 as noted above, great bending of the arm end member 2 relative to the arm stem member 1 as shown in FIG. 4(b) displaces the pulley 12 greatly toward the arm stem member 1. Thus, it is possible to hold the length of the wires 8 passing through the joint section 6 substantially constant irrespective of the extent of bending the arm end member 2 at the joint section 3.

The above embodiment of the invention relates to an arm mechanism simulating a human arm. However, the invention is applicable to other parts of the human anatomy which undergo bending and stretching such as the shoulders, wrists, fingers. Further, the invention is applicalbe to machines which perform similar operations.

The wire driven mechanism described above can be effectively utilized for machines performing operations similar to bending and stretching, such as robots, artificial arms and various manipulators.

As has been described in the foregoing, with the wire guide apparatus according to the invention, the length of the wires passing through the joint section (elbow or the like) in the wire drive mechanism can be held substantially constant irrespective of the extent of bending at the joint section. Further, the apparatus can be realized with a small-sized, light-weight and simple mechanism.

What is claimed is:

1. A wire guide apparatus for a wire driven mechanism, comprising:

an arm stem member provided with first and second drive sources;

an arm end member provided at one end thereof with a hand section driven by said first drive source of said arm stem member via wires;

joint means rotatably coupling the other end of said arm end member and one end of said arm stem member;

a wire gudie pulley rotatably supported at an eccentric position with respect to an elbow position of said arm end member for guiding said wires such that the wires pass through said arm stem member and said arm end member; and means for causing said arm end member to be bent in said joint means with respect to said arm stem member by said second drive source of said arm stem member;

said wire guide pulley being displaced toward said arm stem member by an amount corresponding to an extent of bending of said arm end member.

* * * * *

UNITED STATES PATENT AND TRADEMARK OFFICE
CERTIFICATE OF CORRECTION

PATENT NO. : 5,020,388

DATED : June 4, 1991

INVENTOR(S) : Yuji Maeda

It is certified that error appears in the above-identified patent and that said Letters Patent is hereby corrected as shown below:

On the Title page

The Assignee is incorrect, should be, --Agency of Industrial Science and Technology, Ministry of International Trade & Industry, Tokyo, Japan--.

Signed and Sealed this

Twenty-sixth Day of January, 1993

*Attest:*

STEPHEN G. KUNIN

*Attesting Officer*   *Acting Commissioner of Patents and Trademarks*